(12) United States Patent
Barton

(10) Patent No.: US 10,427,718 B1
(45) Date of Patent: Oct. 1, 2019

(54) TRUCK DRIVELINE SUSPENDER

(71) Applicant: David Barton, Stockton, CA (US)

(72) Inventor: David Barton, Stockton, CA (US)

( * ) Notice: Subject to any disclaimer, the term of this patent is extended or adjusted under 35 U.S.C. 154(b) by 236 days.

(21) Appl. No.: 15/496,933

(22) Filed: Apr. 25, 2017

Related U.S. Application Data

(60) Provisional application No. 62/326,955, filed on Apr. 25, 2016.

(51) Int. Cl.
  *B62D 21/03* (2006.01)
  *B60K 17/24* (2006.01)
  *B62D 21/14* (2006.01)

(52) U.S. Cl.
  CPC .............. *B62D 21/03* (2013.01); *B60K 17/24* (2013.01); *B62D 21/14* (2013.01)

(58) Field of Classification Search
  CPC ........ B62D 21/03; B62D 21/14; B60K 17/22; B60K 17/24; B60K 28/14; B60K 28/165; B60K 23/00
  See application file for complete search history.

(56) References Cited

U.S. PATENT DOCUMENTS

| | | | | |
|---|---|---|---|---|
| 4,875,538 A | * | 10/1989 | Hodgson | B60K 17/22 180/379 |
| 5,383,743 A | * | 1/1995 | Swisher, Jr. | B60K 17/22 180/383 |
| 5,551,783 A | * | 9/1996 | Whitney | B60K 17/24 384/536 |
| 5,562,179 A | * | 10/1996 | McAdam | B60K 17/22 180/312 |
| 5,870,931 A | * | 2/1999 | Frantz | B60K 17/24 464/170 |
| 6,231,061 B1 | * | 5/2001 | Cope | B60K 17/24 180/312 |
| 6,345,680 B1 | * | 2/2002 | Hill | B60K 17/24 180/209 |
| 6,435,299 B1 | * | 8/2002 | Miller | B60K 17/24 180/379 |
| 6,547,025 B1 | * | 4/2003 | Gassmann | B60K 17/00 180/245 |
| 2002/0139603 A1 | * | 10/2002 | Aiken | B60K 17/24 180/381 |
| 2005/0061573 A1 | * | 3/2005 | Mizuno | B60K 17/04 180/376 |

(Continued)

*Primary Examiner* — Barry Gooden, Jr.
(74) *Attorney, Agent, or Firm* — Heisler & Associates

(57) ABSTRACT

An elongate crossbar is provided with adjustable length. Ends of the crossbar are spaced from each other a distance matching a spacing between longitudinally extending frame members of a vehicle which has had its driveline detached from drive wheels and needs to be suspended. A saddle is attached to the crossbar with the saddle having a rest area the driveline can rest upon. Ends of the crossbar preferably include brackets which grip portions of the frame members. The crossbar can include a spring which urges first and second ends of the crossbar away from each other, and with a lock nut acting on a threaded shaft at a first end of the crossbar to lock the crossbar at a desired length once positioned. The saddle preferably includes hooks at the ends of arms on either side of the rest area so that the saddle can conveniently suspend from the crossbar.

17 Claims, 4 Drawing Sheets

(56) References Cited

U.S. PATENT DOCUMENTS

| | | | |
|---|---|---|---|
| 2006/0147143 A1* | 7/2006 | Joyner | B60K 17/24 |
| | | | 384/535 |
| 2009/0172925 A1* | 7/2009 | Goeson | B60P 7/0823 |
| | | | 24/300 |
| 2018/0112710 A1* | 4/2018 | Considine | B60K 17/24 |
| 2019/0210457 A1* | 7/2019 | Galsworthy | B60G 3/20 |

* cited by examiner

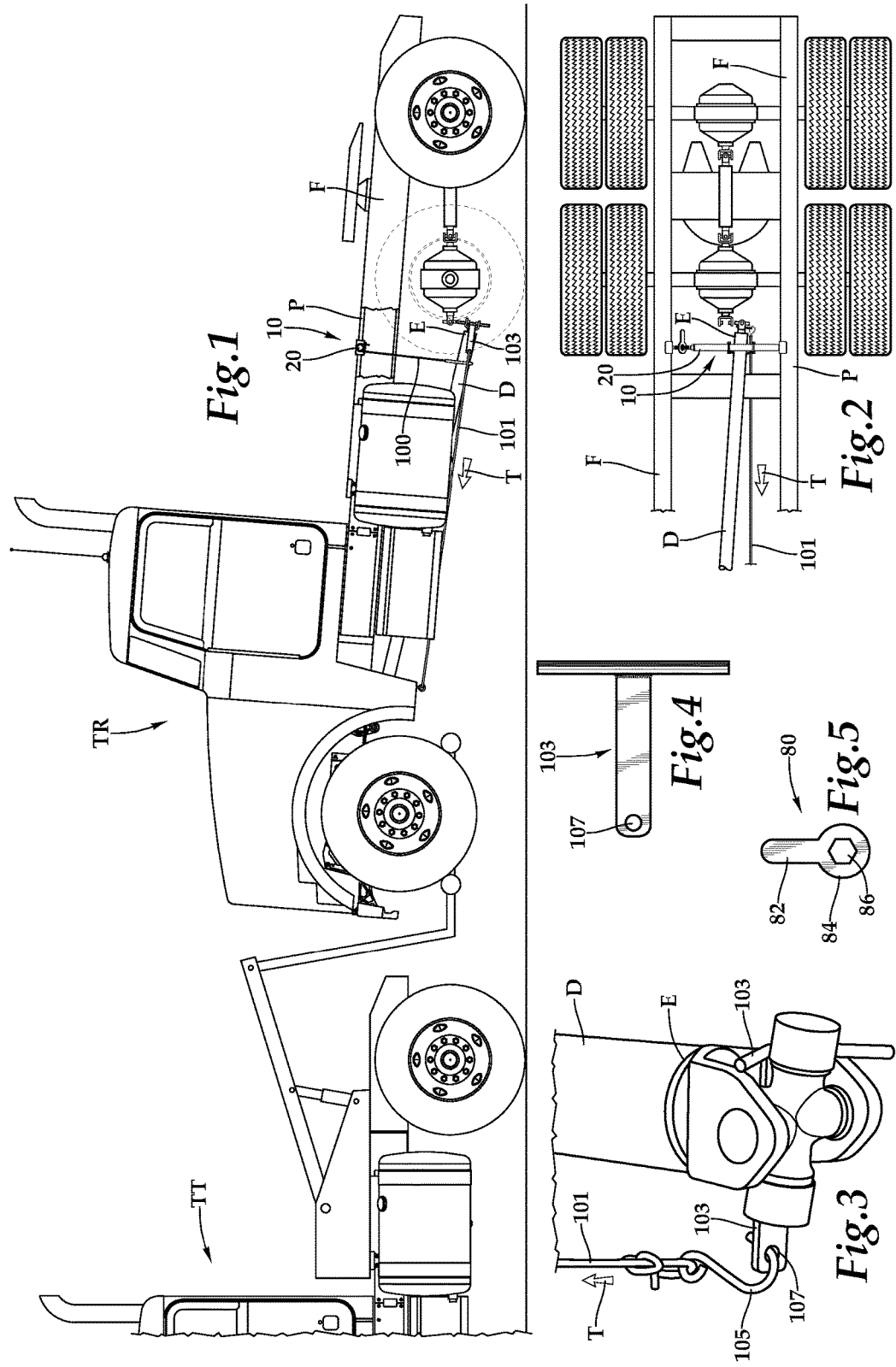

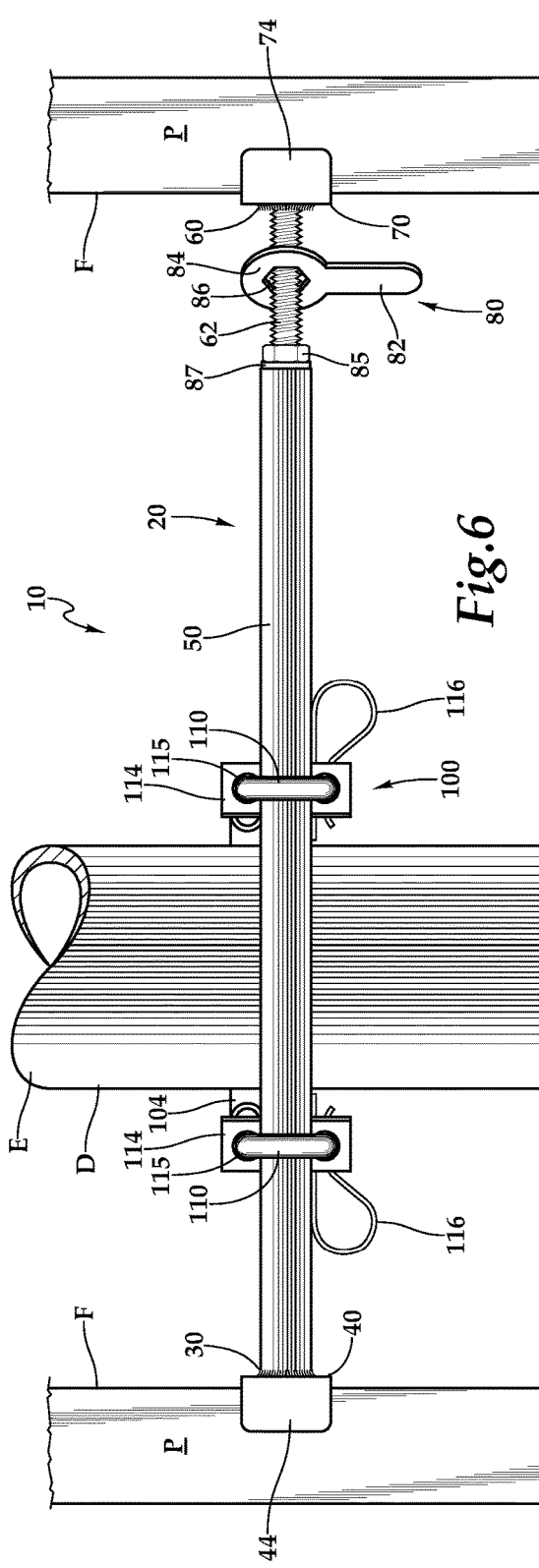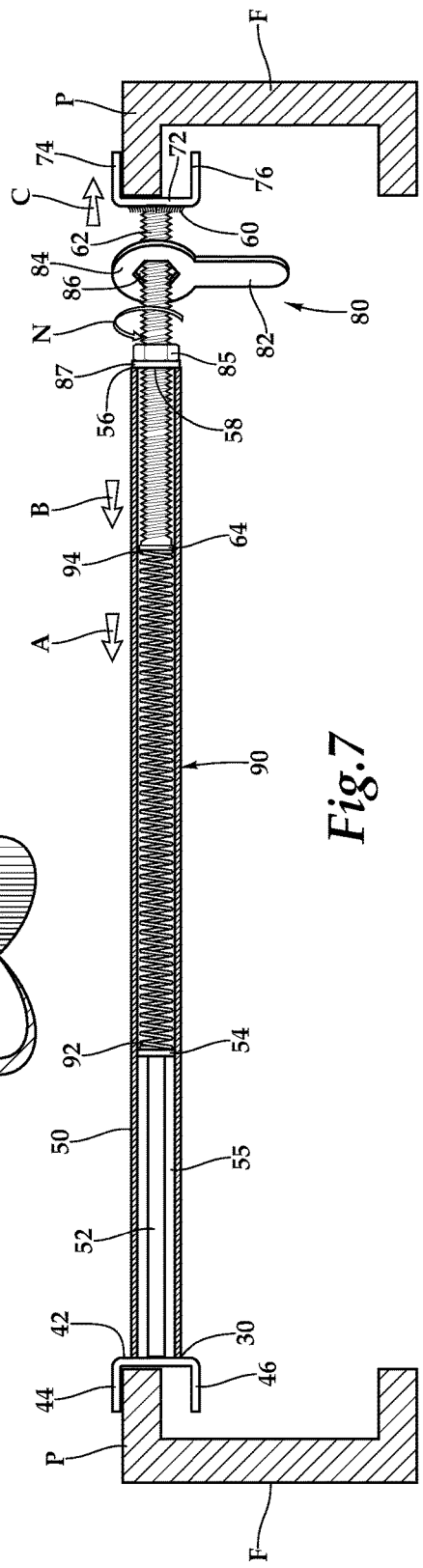

TRUCK DRIVELINE SUSPENDER

CROSS-REFERENCE TO RELATED APPLICATIONS

This application claims benefit under Title 35, United States Code § 119(e) of U.S. Provisional Application No. 62/326,955 filed on Apr. 25, 2016.

FIELD OF THE INVENTION

The following invention relates to brackets and holders for supporting portions of a driveline or similar power train equipment of a vehicle. More particularly, this invention relates to devices which can temporarily hold a driveline when it is detached from drive wheels, particularly of a truck driveline, to keep the driveline distal end off of the ground, such as during towing of the vehicle.

BACKGROUND OF THE INVENTION

The tractor portion of a large truck has a driveline which extends from the engine to at least one drive axle thereof. This driveline is a linear elongate shaft which can be exposed or in some instances is contained within an outer cylindrical housing. The driveline rotates about its long axis and receives power/torque at a forward input end from the engine (typically through a transmission) and delivers power/torque at an output distal end, typically where it interfaces with a differential or other axle interface to cause rotation of the drive axle which is oriented perpendicular to the driveline, and drive wheels thereon. In this way, power is transmitted from the engine to the drive axle for driving of the tractor portion of the large truck.

Often it is necessary to tow a large tractor portion of a truck on a roadway. There are many appropriate configurations for towing such a large tractor portion of a truck. At least some of these towing configurations require that the driveline be disengaged for towing (or at least benefit from such disengagement). In the prior art this has often meant that the driveline had to be completely uninstalled from between the engine and the drive axle. This laborious process would then have to be repeated to reinstall the driveline after towing was completed.

However, if the driveline could be disconnected at just one end, and then held securely in position still attached, such as at the forward end to the engine of the tractor portion of the large truck, but disengaged at the distal end from the drive axle, the driveline could potentially be carried in a partially still connected state and still be effectively disconnected for towing. In the prior art no easy to utilize and reliable disconnected driveline holding system is known for effectively holding the driveline in this partially disconnected state. While one could utilize rope or other straps to tie the driveline to the tractor frame and hold it in place while disconnected, such ad hoc tying configurations are not particularly desirable in that the driveline is thus allowed to sway or otherwise move about to some extent and has the potential to become damaged or to work its way out of position. Accordingly, a need exists for a suspender for a driveline which can securely hold the driveline in a partially disassembled state while still connected to the engine at a proximal end thereof.

SUMMARY OF THE INVENTION

With this invention, a driveline suspender is provided which holds the driveline in a partially disassembled state, still connected to the engine at a proximal end, but disconnected from the drive axle and drive wheels at a distal end. The suspender of this system holds the driveline, which has been disconnected from a drive axle at its distal end, above ground and sufficiently secure to enable safe towing of the tractor portion of the large truck.

The suspender system includes two main parts including a crossbar and a saddle. The crossbar is oriented transverse between longitudinal left and right frame members of the tractor. This crossbar is oriented perpendicular to these frame members and typically includes first and second brackets which are "U" shaped and can be oriented to abut top plates of these longitudinal frame members for secure attachment thereto. The crossbar is preferably adjustable in length so that it can be secured firmly between these two longitudinal frame members.

The second portion of the suspender system includes the saddle which hangs from the crossbar and has an overall "U" shape with a rest portion at a lower end preferably forming a curve, and typically with a diameter similar to that of the driveline, so that the rest portion of the saddle can be located beneath the driveline and carry the driveline thereon. Upper ends of the saddle end preferably at hooks. These hooks rest over the crossbar. Typically capture pins, such as cotter pins, are associated with the hooks and can connect beneath the crossbar to act as safety elements to keep the hooks attached to the crossbar when installed in position.

When so positioned on a tractor beneath the longitudinal frame members, the crossbar is rigidly held in position and the saddle is suspended down from the crossbar. The driveline is placed upon the rest curve of the saddle so that the driveline is held suspended above ground with its weight carried by the saddle and in turn carried by the crossbar over to the frame members. If desired, a line can be coupled to a rearward end of the driveline to tension the driveline toward the engine. Such a tie off is advantageous where the driveline is of a splined nature or otherwise is theoretically capable of longitudinally moving and becoming disconnected from the engine or other supports on a proximal end of the driveline, by keeping the driveline tight and held at its proximal end, such as by the engine or transmission.

A highly secure position for the driveline is thus maintained for towing of the tractor portion of the large truck. When the towing procedure is over, the driveline is held in position ready to be reattached to the drive axle. Once the driveline has been reattached to the drive axle, it is elevated above the rest of the saddle, and the saddle can have its hooks lifted up off of the crossbar and taken away from the driveline. Finally, the crossbar can be disconnected from the frame members to allow for removal of the crossbar.

In one embodiment, crossbars of standard appropriate lengths are provided. In other instances, the crossbar is configured to accommodate different longitudinal frame members having different spacings therebetween. In one embodiment the crossbar is merely configured as a turnbuckle which can have ends thereof rotated until a desired length is provided. If desired, a nut can be provided as a lock nut on one (or both) ends which can be tightened to lock out the turnbuckle at a finish length of a desired amount. While the turnbuckle has loops at ends thereof in one embodiment, which could accommodate bolts or other fasteners to connect to the longitudinal frame members, first and second brackets could alternatively be provided or other end interface fasteners could be utilized for interfacing with and fastening to the longitudinal frame members.

In one embodiment, the crossbar has an elongate cylindrical housing with a hollow interior. A first bracket is fixed to one end of this housing. Adjacent to the first bracket and within the housing a fixed spacer is provided ending at a fixed plate. A compression spring is located within the housing with one end adjacent to the fixed plate and an opposite end adjacent to a moving plate. The spring can thus be compressed when the moving plate moves toward the fixed plate.

When the moving plate moves, a threaded shaft coupled to the moving plate moves therewith, causing the second bracket to move toward the first bracket and vise versa. The first bracket and second bracket are spaced apart due to tension of the spring, by a distance which is slightly greater than a typical greatest distance between longitudinal frame members. Thus, to get the first bracket and second bracket to engage the frame members, the second bracket must be pushed toward the first bracket, causing motion of the threaded shaft and moving plate and compression of the spring. The first and second brackets can then be positioned adjacent to the longitudinal frame members and allowed to return, under forces applied by the spring, until the first bracket and second bracket are secured against the frame members.

Finally, a lock nut and washer can be rotated upon the threaded shaft and against an end plate of the housing to tighten the threaded shaft and lock the overall crossbar so that the spring no longer allows length reduction of the crossbar. Tightening of the locknut could occur with any standard wrench. However, for convenience a captured wrench can be provided upon the threaded shaft and between the lock nut and the second bracket. The captured wrench would thus be readily available and could be rotated to cause rotation of the nut until the nut is held fast against the washer and in turn against the end plate of the housing. If desired, the nut could be in the form of a lock nut or could have a second nut adjacent thereto which functions as a lock nut through utilization of a pair of nuts adjacent to each other.

The rest portion of the saddle preferably has a rubberized or other cushioned layer thereon. Upper portions of the saddle transition into the hooks which are preferably formed by bent steel or other metal, but could conceivably be formed from high strength plastic. Because the driveline is rather heavy, the saddle is manufactured from sufficiently robust materials and with sufficiently robust dimensions so that it can handle the forces associated with gravity and other forces acting on the driveline.

Similarly, the crossbar is sufficiently heavy duty to support the weight of the saddle and the driveline with a large margin of safety, such as to fully resist loads associated with the driveline should it bounce significantly and have forces associated therewith and acting downward on the saddle magnified by any such bouncing. Furthermore, by cushioning the surface of the rest, if any such bouncing occurs the forces associated therewith are ameliorated somewhat by resilient materials located upon the rest. A curvature of the hooks on the saddle preferably matches a diameter of the crossbar so that the hooks are fairly secure as they rest upon the crossbar. However, the hooks can move laterally upon the crossbar to allow for positioning of the saddle precisely where desired and suspending down from the crossbar. Latch bars and pins on the hooks can be positioned to temporarily lock the hooks to the crossbar for added security against inadvertent detachment of the saddle from the crossbar.

OBJECTS OF THE INVENTION

Accordingly, a primary object of the present invention is to provide a system for suspending a distal end of a driveline above ground when it is detached from drive wheels, such as for towing of a vehicle with the driveline detached.

Another object of the present invention is to provide a method for suspending a driveline above ground when the driveline's vehicle is being towed.

Another object of the present invention is to more efficiently tow a vehicle, and especially a large truck, with the driveline detached and securely suspended above ground, such as by a suspension apparatus like that provided herein.

Another object of the present invention is to securely hold a driveline in a detached position above ground.

Another object of the present invention is to provide a driveline suspension system which is easy to use both for detaching the driveline, holding the driveline when detached and to assist in reattaching the driveline.

Another object of the present invention is to speed up and simplify the process of towing a vehicle with a driveline of the vehicle detached, especially for a solo operator.

Another object of the present invention is to make the process of detaching a vehicle driveline and reattaching the vehicle driveline safer, and to also make the process of towing a vehicle with its driveline detached a safer endeavor.

Other further objects of the present invention will become apparent from a careful reading of the included drawing figures, the claims and detailed description of the invention.

BRIEF DESCRIPTION OF THE DRAWINGS

FIG. 1 is a side elevation view of a tow truck and towed rig during towing thereof with the driveline detached and utilizing the driveline suspender of this invention.

FIG. 2 is a top plan view of that which is shown in FIG. 1 at a region where the driveline is detached from drive wheels of the vehicle and showing the driveline suspender of this invention in place suspending the driveline above ground.

FIG. 3 is a detail of a portion of that which is shown in FIG. 1, revealing how a T-bracket and line are used to tension the driveline forward and to keep it attached at a proximal end to an engine within the towed rig.

FIG. 4 is a top plan view of the T-bracket used to allow a line to be attached to a distal end of the driveline for tensioning of the driveline, to keep the driveline in a desired detached position during towing.

FIG. 5 is an elevation view of a captured wrench used with the crossbar of this invention for tightening thereof.

FIG. 6 is a top plan view of the driveline suspender system of this invention with a crossbar portion interposed between longitudinal frame members of a vehicle and with a saddle portion suspended from the crossbar portion, and with a driveline of the vehicle resting upon the saddle.

FIG. 7 is a front elevation full sectional view of that which is shown in FIG. 6, but with the saddle removed, and illustrating how the mechanism within the crossbar in one embodiment operates to tension the crossbar between parallel frame members of the vehicle.

DESCRIPTION OF THE PREFERRED EMBODIMENT

Figure 8:
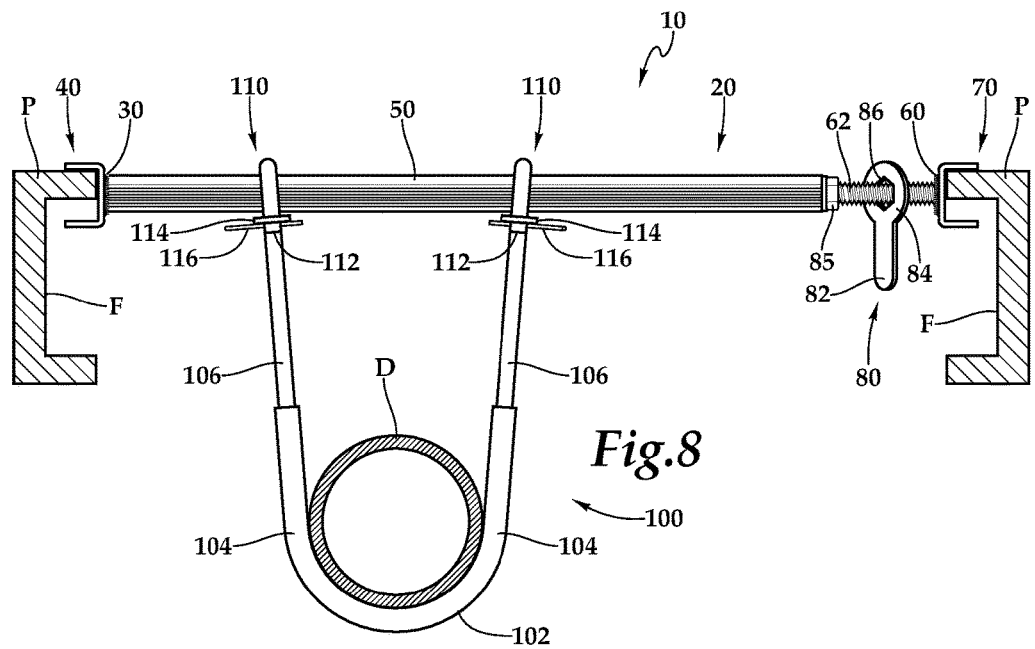
FIG. 8 is a front elevation view of the driveline suspender of this invention along with both the crossbar and saddle shown carrying a driveline, and with the crossbar suspended from parallel longitudinal frame members of the vehicle.

Referring to the drawings, wherein like reference numerals represent like parts throughout the various drawing figures, reference numeral 10 (FIGS. 1 and 2) is directed to a suspender system for suspending of a distal end E of a driveline D of a vehicle, such as a towed rig TR, from frame members F of the towed rig TR. The suspender system 10 holds the driveline D off of the ground, such as during towing of the towed rig TR with a tow truck TT while the driveline D is detached from drive wheels of the towed rig TR.

In essence, and with particular reference to FIGS. 6-8 and 10, basic details of the suspender system 10 are described, according to a most preferred embodiment. The suspender system 10 includes two major subcomponents including a crossbar 20 and a saddle 100. The crossbar 20 is suspended between longitudinally extending frame members F of a vehicle such as the towed rig TR. The crossbar 20 includes the first assembly 30 terminating a first bracket 40 at a first end of the crossbar 20. A second assembly 60 terminates at a second bracket 70 defining a second end of the crossbar 20. A housing 50 is fixed to the first assembly 30 and contains a spring 90 therein along with portions of the second assembly 60. The spring 90 urges the first bracket 40 and second bracket 70 away from each other and into engagement with the frame members F. A nut 85 and captured wrench 80 can be used together to lock the crossbar 20 at a fixed length after it has been securely positioned between the frame members F. The saddle 100 includes a rest area in the form of a rest curve 102 (in this embodiment) located between arms 106 which extend up to hooks 110. The hooks 110 suspend the saddle 100 from the crossbar 20. As an alternative to the crossbar 20, a basic turnbuckle crossbar 120 can be utilized along with the saddle 100.

More specifically, and with continuing particular reference to FIGS. 6-8 and 10, details of the crossbar 20 are described according to a most preferred embodiment. The crossbar 20 acts as a substantially horizontal member of preferably adjustable elongate form so that it can span between and securely hold itself to inwardly facing portions of a pair of typically substantially parallel longitudinal frame members F of a vehicle, such as the towed rig TR (FIG. 1) or other truck, or other vehicle. These frame members F typically have a C-shaped cross-section which includes substantially planar and horizontally oriented top plates P with edges that face inwardly toward each other. The edges of the top plates P of the frame members F are preferably used within a gap of first bracket 40 and a gap of a second bracket 70 of the crossbar 20 for secure attachment of the crossbar 20 between the frame members F.

The crossbar 20 is preferably adjustable in length, both so that it can accommodate different frame member F spacings, and also to facilitate tight supporting of the crossbar 20 between the frame members F. In particular, and in this preferred embodiment, the crossbar 20 includes the first assembly 30 and the second assembly 60. The first assembly 30 includes the first bracket 40 which engages one of the top plates P of one of the frame members F adjacent to the first end of the crossbar 20. This first bracket 40 preferably includes a base plate 42 which is located in a plane generally perpendicular to a long axis of the crossbar 20, and with a top plate 44 and bottom plate 46 joined to upper and lower edges of the base plate 42. The top and bottom plates 44, 46 are preferably parallel to each other and perpendicular to the base plate 42. This first bracket 40 includes a gap between the top plate 44 and bottom plate 46 which accommodates the inwardly facing tip of one of the top plate P of one of the frame members F.

The housing 50 extends from the first bracket 40 along the centerline of the crossbar 20. The housing 50 is preferably a cylindrical elongate structure with a hollow interior 55. While the housing 50 could be fitted with a large long spring, most preferably a portion of this housing 50 is closed off by providing a fixed spacer 52 and fixed plate 54 therein, leaving only a portion of the housing spaced from the first bracket 40 open to accommodate the spring 90. An end plate 56 defines an end of the housing 50 most distant from the first bracket 40. A passage 58 passes through this end plate 56 so that portions of the second assembly 60 can pass into the interior 55 of the housing 50 and engage the spring 90 within the housing 50 and between the fixed plate 54 and the end plate 56. The spring 90 is preferably a helical compression spring with a diameter which allows it to fit within the interior 55 of the housing 50 between the fixed plate 54 and portions of the second assembly 60 within the interior 55.

Preferably the first assembly 30 is formed of rigid material, such as steel. Other materials such as high-strength plastic could alternatively be utilized. While the first bracket 40 is shown affixed to the first assembly 30, it is conceivable that the first bracket 40 could swivel relative to the housing 50 and other portions of the first assembly 30. While the first bracket 40 is shown with a generally C-shaped cross-section, the first bracket 40 could have other configurations which would still allow it to engage one of the frame members F.

If the frame members F on occasion do not include top plates P with edges available to be received within the gap of the first bracket 40, the first bracket 40 could be provided as an L-shaped bracket rather than a C-shaped bracket and the bottom plate 46 could be essentially removed to provide such an L-shaped bracket alternative. Such a configuration would work on frame members F which do not include a top plate P with a radially facing edge. If desired, resilient pads could be provided within the brackets 40, 70 which would be compressed somewhat and provide a high friction interface between the brackets 40, 70 to engage the frame members F with enhanced friction to securely hold the crossbar 20 in place between the frame members F. The plates 44,46 have sufficient size away from the base plate 42 to prevent the crossbar 20 from coming off of the frame members F, should the tension between the crossbar 20 and the frame members F be insufficient to hold the crossbar 20 tightly in position.

The second assembly 60 defines portions of the crossbar 20 second end thereof opposite the first assembly 30. The second assembly 60 includes a threaded shaft 62 extending away from a second bracket 70 to a moving plate 64 at an end of the threaded shaft 62 most distant from the second bracket 70. The moving plate 64 is located within the interior 55 of the housing 50, with the threaded shaft 62 passing through the passage 58 in the end plate 56 at the end of the housing 50 opposite the first bracket 40. The threaded shaft 62 is fixed (or swivel attached) to the second bracket 70 at an end of the threaded shaft 60 opposite the moving plate 64. The second bracket 70 is preferably similar to the first bracket 40, including a base plate 72, top plate 74 and bottom plate 76 to engage one of the frame members F.

The spring 90 includes a fixed end 92 located adjacent to the fix plate 54 within the interior 55 of the housing 50 and with a moving end 94 opposite the fixed end 92. This moving end 94 pushes against the moving plate 64 of the second assembly 60. The spring 90 thus provides a force (when the spring 90 is compressed away from a rest state) which pushes on the moving flight 64 and urges the threaded shaft 62 of the second assembly 60, along with the second bracket 70, away from the first assembly 30.

The crossbar 20 is thus urged by the spring 90 toward a maximum length. This maximum length is preferably greater than the distance between the frame members F. By compressing the spring 90, the crossbar 20 is shortened until it is shorter than the distance between the frame members F. The spring 90 then pushes between the first assembly 30 and second assembly 60 to cause the first bracket 40 and the second bracket 70 to come into engagement with the top plates P of the frame members F. The spring 90 provides a force which tends to keep the first bracket 40 and second bracket 70 engaged against the frame member F.

To further lock the crossbar 20 at this desirable length, a nut 85 is preferably located upon the threaded shaft 62. A washer is provided between the nut 85 and the end plate 56 on the end of the housing 50 opposite of the first bracket 40. The nut 85 can be tightened upon the threaded shaft 62 until it presses the washer 87 against the end plate 56. Further tightening of the nut 85 will tend to draw the second assembly 60 away from the first assembly 30 and further tighten the crossbar 20 between the frame members F.

To ensure that a wrench is always available to tighten the nut 85, preferably a captured wrench 80 is captured upon the threaded shaft 62 and adjacent to the nut 85. This captured wrench 80 includes a handle 82 extending away from a head 84. The head 84 includes a faceted opening 86 with the threaded shaft 62 passing through this faceted opening 86. Facets of the facet opening 86 are sized and located and oriented so that they can engage facets of the nut 85. A user can then rotate the wrench (along arrow N of FIG. 7) to tighten the nut 85 and lock the crossbar 20 between the frame members F. The captured wrench 80 can remain dangling upon the threaded shaft 62 after use. The captured wrench 80 is thus always available for use as needed.

In use and operation, and to secure the crossbar 20 to frame members F, initially the nut 85 is loosened (by rotation opposite arrow N) a sufficient distance to allow the first bracket 40 and second bracket 70 to be free from the frame members F. The first assembly 30 and second assembly 60 of the crossbar 20 are compressed toward each other (along arrow B of FIG. 7), causing compression of the spring 90 (along arrow A of FIG. 7). The crossbar 20 is then positioned where desired between the frame members F. The spring 90 is an allowed to drive the first bracket 40 and second bracket 70 away from each other (along arrow C of FIG. 7) until they engage the frame members F. Finally, the nut 85 is rotated (along arrow N of FIG. 7), such as by using the captured wrench 80, to tighten the nut 85 and secure the crossbar 20 between the frame members F.

Figure 9:
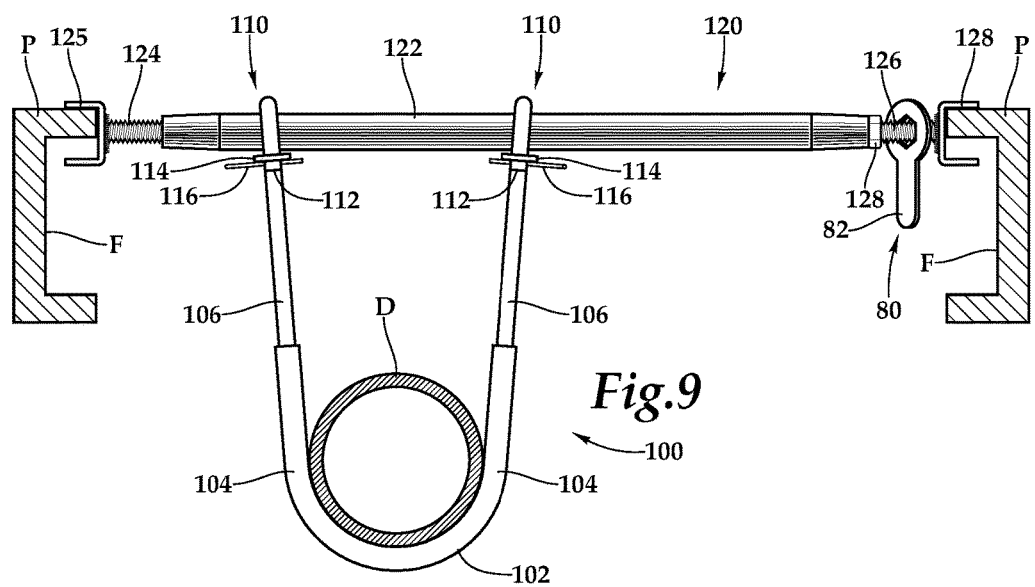
FIG. 9 is a front elevation view similar to that which is shown in FIG. 8, but for an alternative crossbar generally in the form of a turnbuckle and with the saddle of this invention resting upon the alternative crossbar.
Figure 10:
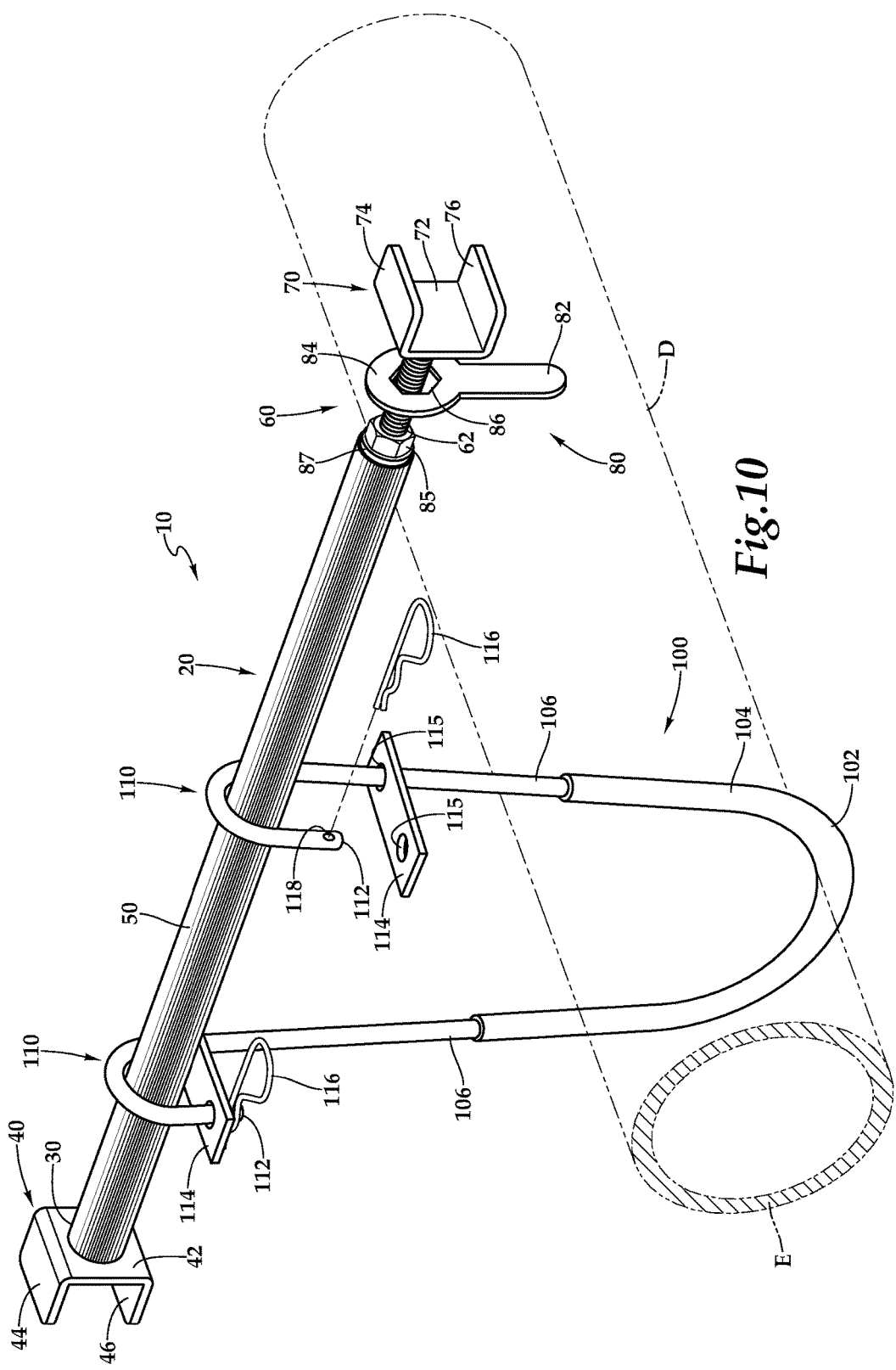
FIG. 10 is a perspective partially exploded view of the driveline suspender of this invention and with a driveline shown in broken lines suspended therefrom.

As an alternative to the crossbar 20, a turnbuckle crossbar 120 can be provided (FIG. 9). Such a turnbuckle crossbar 120 includes a central sleeve 122 which is preferably of cylindrical form and includes female threads within an interior thereof. A first end 124 and second end 126 are provided at opposite ends of this crossbar 120 which are each in the form of threaded shafts threading into opposite ends of the central sleeve 122. A first end bracket 125 is fixed to the first end 124 and a second end bracket 127 is fixed to the second end 126. Preferably these end brackets 125, 127 are fixed in position, but allowed to rotate relative to the first end 124 and second end 126, so that the brackets 125, 127 can swivel to be most easily aligned with the top plates P of the frame members F. If desired, a lock nut 128 (and optionally also a captured wrench 80) can be provided on at least one of the ends 124, 126 to allow the lock nut 128 to be tightened and lock a length of the turnbuckle crossbar 120.

With either the crossbar 20 or turnbuckle crossbar 120, the driveline D is thus suspended upon a rest area of a saddle 100 such as that also disclosed herein, after the saddle 100 is suspended from the crossbar 20, 120. The saddle 100 includes a rest area suspended from at least one hook or other structure from the crossbar 20, 120. Most preferably, the rest area is in the form of a rest curve one or two of semicircular form which transitions into arms 106 which extend up to hooks 110 at uppermost portions of each arm 106. A resilient sleeve 104 preferably is slid over the rest curve 102 (or provided as a coating or otherwise attached) to provide a resilient interface against which the driveline D can rest.

The hooks 110 are sized to curve over the crossbar 20, 120 so that the entire saddle 100 is suspended beneath the crossbar 20, 120. Each hook 110 preferably terminates at tips 112 which extends back downward after the hooks 110 extend up over the crossbar 20, 120.

Latch bars 114 are optionally but preferably provided adjacent these tips 112. Each latch bar 114 preferably includes two holes 115 therein, with the latch bar holes 115 having upper portions of one of the arms 106 passing therethrough and also with one of the tips 112 passing therethrough. A bore 118 adjacent to each tip 112 can receive a pin such as a cotter pin 116 to lock the latch bars 114 in place, ensuring that the hooks 110 are securely mounted to the crossbar 20, 120 and cannot bounce off of or otherwise become dislodged off of the crossbar 20, 120. Cotter pins 116 or other pins can be captured to the saddle 100, such as by lanyards so that the cotter pins 116 or other pins will not become lost.

The saddle 100 is shown formed of circular cross-section bar stock which is preferably formed of steel or other rigid material, but could be formed of plastic, provided is of sufficiently high strength, or formed of other composite materials. The barstock can readily be bent to form the rest curve 102 and the hooks 110 to form the saddle 100 as shown. As an alternative, barstock with a square or rectangular cross-sectional form can be utilized. In the case of barstock with a rectangular cross-section, preferably, the rest defines a wide surface upon which the driveline D can rest, and the hooks 110 can have this rectangular barstock oriented so that maximal surface area allows the saddle 100 to bear upon the crossbar 20.

When the driveline D is disconnected from the drive wheels, it can remain attached at a proximal end joined to a transmission or other interface to an engine of the vehicle, such as the towed rig TR (FIG. 1). Typically this connection is through a splined shaft. To keep the driveline D from coming off of this spline shaft interface at the proximal end thereof (or other proximal coupling), tension is kept up on the driveline D. To keep this tension on the driveline D, a line 101 is preferably coupled to a T-bracket 103, such as through an S-clip 105 (FIGS. 3 and 4) and with the S clip 105 passing through a hole 107 in a portion of the T-bracket 103. The T-bracket 103 can be interfaced with the detached distal end E of the driveline D in a secure fashion, leaving the hole 107 in the T-bracket 103 available for connection to the clip 105. Line 101 is extended forward and attached to some forward portion of the towed rig TR. With tension on this line 101 (along arrow T) the driveline D is kept from becoming detached from the towed rig TR at its proximal end. Furthermore, by routing this line 101 outside of the saddle 100, this line 101 can keep the saddle 100 and crossbar 20, 120 from sliding rearwardly on the vehicle and off of the distal end E of the driveline D. Thus, the line 101 acts as a safety line in multiple ways.

Typically, the suspender system 10 is put in place before the driveline D is detached from drive wheels of the towed rig TR. Then the driveline D can have its distal end E detached. If the driveline D slips out of control of an operator, the saddle 100 is there to catch the driveline D before it falls on the ground or onto the operator. Furthermore, the suspender system 10 can remain in place when it is time for the driveline D to be lifted up and reattached to the drive wheels, and act as a safety against the driveline D falling to the ground or falling upon the operator. If desired, rope or other line, such as the line 101 can be utilized to assist in lifting the driveline D up into position for attachment, and down out of position when detaching, so that an operator never needs to carry the full weight of the driveline D. With such a system 10, a single operator can safely detach and reattach a driveline D of a towed rig TR.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A driveline suspension system, comprising in combination:
   a vehicle having a driveline extending from an engine to drive wheels, said driveline disconnected from said drive wheels;
   an elongate, adjustable length crossbar configured to be interposed between longitudinally extending frame members of said vehicle with said driveline detached from said drive wheels thereof;
   a saddle removably attachable to said crossbar; and
   said saddle having a width at least as great as a width of said driveline.

2. The system of claim 1 wherein each of said ends of said crossbar include a threaded shaft threaded into opposite ends of a central sleeve having female threads therein matching threads on said threaded shaft of each of said ends.

3. The system of claim 1 wherein said saddle includes at least one hook sized to fit over said crossbar and suspend said saddle from said crossbar.

4. The system of claim 3 wherein said saddle includes a rest area with a pair of arms extending up from said rest area to a pair of hooks, said at least one hook on each of said pair of arms, with each of said hooks resting over said crossbar and suspending said saddle from said crossbar.

5. The system of claim 3 wherein said at least one hook includes a latch bar with at least one hole therein, sized to receive a tip of said at least one hook passing through said hole, a bore passing transversely through said tip and sized to receive a pin passing therethrough, said latch bar located sufficiently close to said tip that said crossbar can be captured between said latch bar and said hook to hold said saddle to said crossbar.

6. The system of claim 1 wherein said crossbar includes a spring between a first end of said crossbar and a second end of said crossbar, said spring urging said first end and said second end away from each other and into engagement with said longitudinally extending frame members of said vehicle.

7. The system of claim 6 wherein said first end of said crossbar includes a housing fixed thereto, with said spring located within an interior of said housing, said second end of said crossbar at least partially passing into an end of said housing opposite said first end of said crossbar, said second end including a moving plate abutting said spring and urging said second end of said crossbar away from said first end of said crossbar through action of said spring when said spring is compressed.

8. The system of claim 7 wherein said second end of said crossbar includes a threaded shaft between said moving plate and a second bracket configured to engage said longitudinally extending frame member adjacent thereto, and with a nut threaded upon said threaded shaft, said second end of said crossbar resisting motion relative to said housing of said first end of said crossbar when said nut is tightened against said end of said housing opposite said first end of said crossbar.

9. The system of claim 8 wherein a wrench is captured upon said threaded shaft of said second end, said wrench including a handle extending from a head, said head including a faceted opening therein with facets sized and shaped to engage said nut, and with said faceted opening captured to said threaded shaft of said second end of said crossbar by said threaded shaft passing through said faceted opening.

10. A driveline suspender, comprising in combination:
    an elongate adjustable length crossbar, configured to be interposed between longitudinally extending frame members of a vehicle with a driveline detached from drive wheels thereof;
    a saddle removably attachable to said crossbar; and
    said saddle having a width at least as great as the width of the driveline.

11. The suspender of claim 10 wherein said saddle includes at least one hook sized to fit over said crossbar and suspend said saddle from said crossbar; and
    wherein said saddle includes a rest area with a pair of arms extending up from said rest area to a pair of hooks, said at least one hook on each of said pair of arms, with each of said hooks resting over said crossbar and suspending said saddle from said crossbar.

12. The suspender of claim 10 wherein said crossbar includes a spring between a first end of said crossbar and a second end of said crossbar, said spring urging said first end and said second end away from each other and into engagement with the longitudinally extending frame members of the vehicle; and
    wherein said first end of said crossbar includes a housing fixed thereto, with said spring located within said housing, said second end of said crossbar at least partially passing into an end of said housing opposite said first end of said crossbar, said second end including a moving plate abutting said spring and urging said second end of said crossbar away from said first end of said crossbar through action of said spring.

13. The suspender of claim 12 wherein said second end of said crossbar includes a threaded shaft between said moving plate and a second bracket configured to engage the longitudinally extending frame member adjacent thereto, and with a nut threaded upon said threaded shaft, said second end of said crossbar resisting motion relative to said housing of said first end of said crossbar when said nut is tightened against said end of said housing opposite said first end of said crossbar; and wherein a wrench is captured upon said threaded shaft of said second end, said wrench including a handle extending from a head, said head including a faceted opening therein with facets sized and shaped to engage said nut, and with said faceted opening captured to said threaded shaft of said second end of said crossbar by said threaded shaft passing through said faceted opening.

14. A method for suspending a driveline of a vehicle from longitudinal frame members of the vehicle when the driveline is detached from drive wheels thereof, the method including the steps of:

securing an elongate crossbar between the frame members of the vehicle;

wherein said securing step includes adjusting a length of the elongate crossbar until the elongate crossbar is secured between the frame members of the vehicle;

connecting a saddle to the crossbar, the saddle having a width at least as great as a width of the driveline; and resting the driveline on the saddle.

15. The method of claim 14 wherein said securing step includes locking a length of the elongate crossbar after the elongate crossbar is secured between the frame members of the vehicle.

16. The method of claim 14 including a further step of tensioning the driveline forward on the vehicle to keep the driveline from becoming detached from the vehicle on portions of the driveline spaced forward from the saddle.

17. The method of claim 14 wherein said connecting step includes the saddle having a rest area between a pair of arms extending up to hooks, the hooks sized to hang from the crossbar, suspending the rest area of the saddle through the arms and the hooks from the crossbar.

* * * * *